United States Patent
Laurenzi et al.

(10) Patent No.: US 11,925,900 B2
(45) Date of Patent: Mar. 12, 2024

(54) PROCESS FOR REDUCING THE CONTENT OF NOX AND N2O FROM A TAIL GAS OF A NITRIC ACID PROCESS

(71) Applicant: CASALE SA, Lugano (CH)

(72) Inventors: Fabio Laurenzi, Lugano (CH); Raffaele Ostuni, Lugano (CH); Jean Francois Granger, Angoulins (FR)

(73) Assignee: CASALE SA, Lugano (CH)

( * ) Notice: Subject to any disclaimer, the term of this patent is extended or adjusted under 35 U.S.C. 154(b) by 0 days.

(21) Appl. No.: 16/976,863

(22) PCT Filed: Feb. 19, 2019

(86) PCT No.: PCT/EP2019/054025
§ 371 (c)(1),
(2) Date: Aug. 31, 2020

(87) PCT Pub. No.: WO2019/166267
PCT Pub. Date: Sep. 6, 2019

(65) Prior Publication Data
US 2021/0069643 A1    Mar. 11, 2021

(30) Foreign Application Priority Data
Mar. 1, 2018    (EP) ..................... 18159533

(51) Int. Cl.
| | | |
|---|---|---|
| *B01D 53/34* | (2006.01) | |
| *B01D 53/14* | (2006.01) | |
| *B01D 53/86* | (2006.01) | |
| *C01B 21/26* | (2006.01) | |
| *B01D 53/56* | (2006.01) | |

(52) U.S. Cl.
CPC ......... *B01D 53/8628* (2013.01); *B01D 53/14* (2013.01); *B01D 53/343* (2013.01); *B01D 53/869* (2013.01); *C01B 21/265* (2013.01); *B01D 53/565* (2013.01); *B01D 2255/20738* (2013.01); *B01D 2255/50* (2013.01); *B01D 2259/65* (2013.01)

(58) Field of Classification Search
None
See application file for complete search history.

(56) References Cited

U.S. PATENT DOCUMENTS

| | | | | |
|---|---|---|---|---|
| 3,568,764 | A | * | 3/1971 | Newman ............... F28F 9/0282 165/134.1 |
| 4,875,436 | A | | 10/1989 | Smith et al. |
| 6,056,928 | A | * | 5/2000 | Fetzer ............... B01D 53/8625 423/235 |
| 2010/0080745 | A1 | * | 4/2010 | Degenstein ............. F23J 15/06 423/239.1 |
| 2010/0098612 | A1 | * | 4/2010 | Lee ........................ B01D 53/90 422/171 |
| 2015/0098881 | A1 | * | 4/2015 | Perbandt ........... B01D 53/8625 423/239.1 |
| 2018/0264408 | A1 | * | 9/2018 | Schwefer ........... B01D 53/8631 |

FOREIGN PATENT DOCUMENTS

| | | | |
|---|---|---|---|
| CN | 104785102 | A | 7/2015 |
| CN | 103230743 | B | 11/2015 |
| DE | 19533715 | A1 | 3/1997 |
| EP | 1488845 | A1 | 12/2004 |
| GB | 1146292 | * | 12/1966 |
| WO | 0151182 | A1 | 7/2001 |
| WO | 0158570 | A1 | 8/2001 |
| WO | 2005000738 | A1 | 1/2005 |
| WO | 2011146469 | A2 | 11/2011 |
| WO | 2011151006 | * | 12/2011 |
| WO | 2011151006 | A1 | 12/2011 |
| WO | 2016184858 | A1 | 11/2016 |

OTHER PUBLICATIONS

Gildert, Gary. "The Eight Steps to Specify a catalyst bed". Johnson Matthey. Process Technologies. Nov. 2014. (Year: 2014).*
International Preliminary Report on Patentability from International Application No. PCT/EP2019/054025 dated May 18, 2020.
International Search Report from International Application No. PCT/EP2019/054025 dated Aug. 8, 2019.

* cited by examiner

*Primary Examiner* — Sheng H Davis
(74) *Attorney, Agent, or Firm* — Dorsey & Whitney LLP

(57) ABSTRACT

Process for reducing the content of NOx and N2O from an input tail gas of a nitric acid process, said input tail gas having a temperature lower than 400° C., the process comprising an abatement stage at least including a deN2O stage and deNOx stage and providing a conditioned tail gas having a temperature greater than the input tail gas, wherein, prior to submission to said abatement stage, said input tail gas is pre-heated to a temperature of at least 400° C. by indirect heat exchange with at least a portion of said conditioned gas.

13 Claims, 1 Drawing Sheet

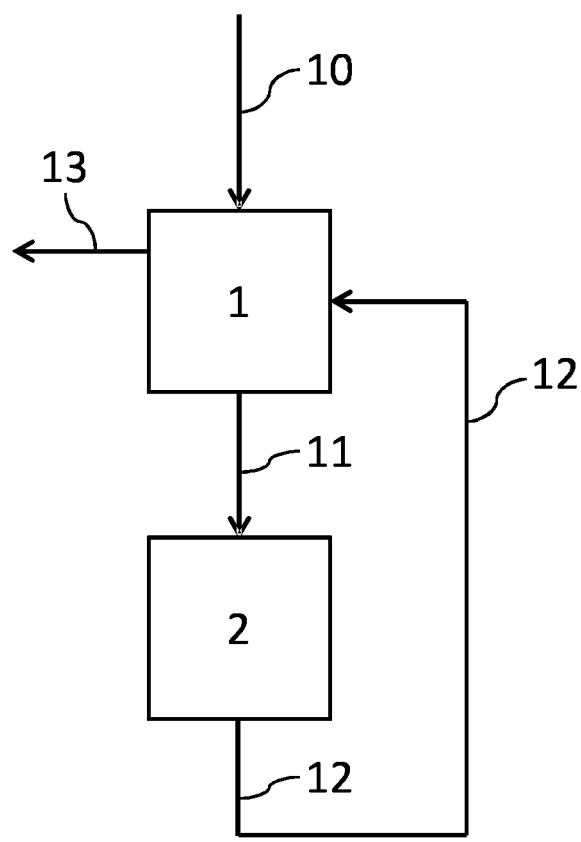

PROCESS FOR REDUCING THE CONTENT OF NOX AND N2O FROM A TAIL GAS OF A NITRIC ACID PROCESS

FIELD OF THE INVENTION

The invention relates to a process for reducing the content of NOx and N2O from a tail gas of a nitric acid process.

PRIOR ART

The industrial process for the synthesis of nitric acid involves the catalytic oxidation of ammonia typically over platinum-rhodium (Pt—Rh) catalytic gauzes, producing a gas containing N2O and nitrogen oxides NOx (NO and NO2), and a subsequent step of absorption, wherein said gas is contacted with water to absorb NO2 in water and produce nitric acid. N2O is not absorbed. The absorption stage delivers a liquid product stream containing nitric acid, and a tail gas containing N2O and residual NOx. Said tail gas is at pressure above atmospheric and is normally work-expanded in a suitable expander for energy recovery before being discharged into the atmosphere.

NOx and N2O are known pollutants and the related emissions are subject to strict regulations. A gas vented in atmosphere may be required to meet very low limits of NOx and N2O content, such as a maximum content of 100 ppm each or even less.

In order to minimize said emissions, the tail gas is commonly subjected to abatement of N2O and/or abatement of NOx. A stage or a process step for reduction of N2O content is termed deN2O and a stage or a process step for reduction of NOx content is termed deNOx.

DeN2O and DeNOx are termed primary, secondary, tertiary or quaternary abatement, according to the stage of the nitric acid process during which they are carried out.

The abatement of N2O and NOx from the tail gas of the absorption stage and upstream of the tail gas expander is termed tertiary abatement. N2O does not play a role in the formation of nitric acid and, therefore, may also be removed in the previous process steps. Removal of N2O from the gas after the oxidation of ammonia and before the absorption stage is referred to as secondary abatement, whilst measures aimed to avoid N2O formation during the oxidation of ammonia are called primary abatement. Abatement of N2O and/or NOx performed after the expansion (i.e. downstream of the expander) is termed quaternary abatement.

A known process for tertiary and quaternary abatement involves catalytic decomposition of N2O over an iron-loaded zeolite and catalytic reduction of NOx with a suitable reducing agent, typically ammonia. Catalysts used in the NOx reduction include iron-loaded (e.g. iron-exchanged) zeolites, copper-loaded (e.g. copper-exchanged) zeolites and vanadium based catalysts.

Iron-loaded zeolite catalysts are known to be effective in N2O decomposition at temperature greater than 400° C. However, especially in old plants, the tail gas is available for tertiary abatement at temperatures ranging from 300 to 370° C. Accordingly, in these temperature conditions, said catalysts cannot achieve substantial N2O abatement due to the low catalytic activity (i.e. slow reaction rates).

For example at 350° C., even with a space velocity lower than 5000 Nm3/h/m3 of catalyst (i.e. with a large catalyst volume compared with the tail gas flow rate), a decomposition of only about 20% N2O is achievable using an iron-loaded zeolite of the art. Therefore, with an inlet N2O of 1000 ppm, still 800 ppm N2O would remain in the tail gas after abatement.

On the other hand, catalysts for NOx reduction are active at temperatures below 400° C. Copper-loaded zeolite and vanadium-based deNOx catalysts are not active for concurrent N2O decomposition, while iron-loaded zeolite deNOx catalysts are active for concurrent N2O decomposition only at high temperature >400° C.

In the prior art, tertiary and quaternary deNOx are normally carried out upstream or downstream of deN2O without intermediate heat exchange. Therefore, in these conditions the iron-loaded zeolite deN2O catalyst cannot achieve substantial abatement of the N2O due to the low catalytic activity.

SUMMARY OF THE INVENTION

The object of the present invention is to provide an effective method for tertiary and quaternary abatement of NOx and N2O from a tail gas of a nitric acid process, said tail gas having a temperature lower than 400° C. In particular, the object of the present invention is to provide a practical and cost-effective method which is able to provide a significant decomposition of N2O using iron zeolites.

This object is achieved with a process for reducing the content of NOx and N2O from an input tail gas of a nitric acid process according to claim 1.

Said process comprises:

an abatement stage including at least a stage of catalytic N2O decomposition (deN2O) over an iron-loaded zeolite catalyst and a stage of catalytic NOx reduction (deNOx), said abatement stage providing a conditioned tail gas having a temperature greater than the input tail gas, wherein:

prior to submission to said abatement stage, said input tail gas is pre-heated to a temperature of at least 400° C. by indirect heat exchange with at least a portion of said conditioned gas.

The input tail gas has a temperature preferably from 300 to 370° C., more preferably from 330 to 370° C., even more preferably of 360° C. or about 360° C.

The greater temperature of the conditioned tail gas compared to the input tail gas is due to the exothermicity of the abatement stage. The deNOx stage is strongly exothermal and involves the catalytic reduction of NOx into nitrogen and water in the presence of a reducing agent (e.g. ammonia); the deN2O stage is less exothermal than deNOx and involves the catalytic decomposition of N2O.

The heat released by said abatement stage is recovered to pre-heat the input tail gas up to a temperature at which the iron zeolite catalyst is effective in N2O decomposition. Preferably, the input tail gas is pre-heated to a temperature greater than 410° C., more preferably greater than 420° C., even more preferably greater than 430° C.

The invention provides that the input tail gas is subject to a pre-heating step. Preferably, all the heat transferred to the input tail gas during said pre-heating step is taken (recovered) from the heat generated by the exothermal reactions of the abatement stage. According to this preferred embodiment, no heat is transferred to the input tail gas, during the pre-heating step, from an external source such as a fired heater and, consequently, no additional input or energy or fuel is required.

Advantageously, the input tail gas in the deN2O and deNOx stages has a space velocity from 5,000 to 50,000 1/h, based on the catalyst volume in m3 and the flow rate in Nm3/h. The symbol Nm3 denotes normal cubic meters at 0 degrees and atmospheric pressure.

The symbol NOx collectively denotes the so-called nitrogen oxides, namely nitrogen monoxide (NO), nitrogen dioxide (NO2) and possibly N2O4.

A nitric acid process commonly comprises the following stages: oxidation of a stream of ammonia, obtaining a gaseous stream containing NOx and N2O, and absorption of NOx in a suitable absorption medium (e.g. water), obtaining nitric acid and a tail gas containing nitrogen, N2O and residual NOx.

In a preferred embodiment of the invention, the claimed process is performed on the tail gas obtained from the absorption stage, providing for the so called tertiary abatement of NOx and N2O. The conditioned tail gas so obtained is then preferably work-expanded in a suitable expander for power production.

In another embodiment, at least a portion of the tail gas obtained from the absorption stage is work-expanded in said expander and the claimed is performed on the tail gas downstream of the expander, providing for the quaternary abatement of NOx and N2O.

According to a first embodiment, said deN2O and deNOx stages are carried out in separate catalytic beds, with the advantage that the catalysts for said two stages can be selected independently. The deN2O is carried out over an iron zeolite catalyst. The deNOx stage may be carried out over at least one of: a vanadium catalyst, a copper zeolite catalyst and an iron zeolite catalyst.

Vanadium and copper zeolite catalysts are advantageous due to their lower cost. On the other hand, the use of iron zeolite catalyst provides for: additional N2O decomposition during the deNOx stage; greater thermal stability, allowing the use of higher temperatures than vanadium and copper zeolite catalysts and entailing lower catalyst volumes required for the same N2O abatement level; lower residual levels of ammonia in the tail gas (i.e. less ammonia slip).

The deNOx stage may be carried out downstream (i.e. after) or upstream (i.e. before) of the deN2O stage.

Carrying out the deNOx stage downstream of the deN2O stage benefits from the presence of NOx in the tail gas, which provides for higher N2O decomposition rate and higher deN2O catalyst space velocity.

Carrying out the deNOx stage upstream of the deN2O stage has the following advantages.

A first advantage is that the inlet temperature of the deN2O catalytic bed is higher, thanks to the fact that the tail gas already pre-heated in the dedicated pre-heater is further heated during the exothermal deNOx stage prior to its submission into the deN2O stage. A second advantage is an easier mixing of the reducing agent with the tail gas; this is due to the fact that the tail gas may be confined in a pipe with a smaller cross area compared to the effluent of the deN2O catalytic bed inside a reactor. A third advantage is that any slip of ammonia from the deNOx stage is eliminated in the deN2O stage by reaction of ammonia over the iron zeolite catalyst.

According to a second embodiment, the deN2O and deNOx stages are carried out concurrently in the same catalytic bed over the same catalyst or catalysts, preferably over at least an iron zeolite catalyst. Said embodiment has the following advantages.

A first advantage is an easier mixing of the reducing agent and the tail gas as explained above. A second advantage is a simpler and lower-cost reactor; contrary to the two bed configuration, the one bed configuration does not require a physical separation between the beds, thus entailing a higher volume utilization inside the reactor vessel and a smaller vessel for same catalyst volume. A third advantage is a lower pressure drop because tail gas only crosses one catalyst bed not two.

In one embodiment, one of said deNOx stage and deN2O stage is a first stage and the other of said deNOx stage and deN2O stage is a second stage downstream said first stage, and a portion of said input tail gas bypasses said first stage and is sent directly to said second stage. Said bypass may be arranged to take a portion of the input tail gas before or after the preheating step, that is upstream or downstream the related heat exchanger. The bypass flowrate can be determined to achieve accurate control of the temperature and/or of the composition of the input gas fed to the abatement stage.

Another object of the present invention is a system for reducing the content of NOx and N2O according to the attached claims. The system includes at least one catalytic bed, which may include a single catalytic bed performing both the deN2O stage and the deNOx stage, or a plurality of catalytic beds including at least one catalytic bed of the deN2O stage and at least one catalytic bed of the deNOx stage.

In the embodiment with a single catalytic bed, the latter may have an axial, radial or axial-radial configuration. In the embodiment with more than one bed, the catalytic bed may have any combination of axial, radial and axial-radial configurations. The radial and axial-radial configurations entail lower pressure drops than the axial configuration.

In embodiments of the system including multiple catalytic beds and wherein the deN2O stage is arranged first and the deNOx stage is arranged downstream the deN2O stage, an embodiment of the invention includes a bypass of the deN2O stage.

Similarly if the deNOx stage is first and deN2O stage is second, a bypass of the deNOx stage can be provided.

Preferably, said catalytic bed or at least one of said catalytic beds comprises honeycomb type or structured type catalysts, providing for lower pressure drops than pellet catalysts.

Preferably, said tail gas pre-heater is arranged within the catalytic reactor, with the advantage of not requiring a high pressure shell.

Preferably, said catalytic bed(s) are hollow cylinders and the pre-heater is arranged inside cavity(es) of said hollow cylinder(s).

In a preferred embodiment, said tail gas pre-heater is a plate exchanger, for example a shell-and-plate exchanger or a micro-channel exchanger. A related advantage is the higher heat exchange area available, the more compact design and the lower pressure drop.

In another embodiment, said tail gas pre-heater is a shell and tube heat exchanger, preferably with a rod-baffle design or a disc and donuts design. A related advantage is an enhanced heat exchange coefficient which reduces the required heat exchange area.

Advantageously, the tail gas pre-heater has a countercurrent design between the warm side and the cold side so as to enable heat exchange being effective even with a small temperature difference.

Another aspect of the invention is a method for the start-up of said system, according to the attached claim. Said method is effective because the deNOx catalyst is active at temperatures lower than 400° C., even at temperatures of 200-300° C. Therefore, the input tail gas reacts in the deNOx stage to provide said NOx-depleted tail gas. The higher temperature of said NOx-depleted tail gas is used to progressively heat up the input tail gas until the target operating temperature for the deN2O stage is achieved. Accordingly, the tail gas pre-heater preferably comprises a bypass arranged to avoid the NOx-depleted tail gas obtained during the start-up from acting as heat exchange medium in the pre-heater.

A further aspect of the invention is a NOx content in the tail gas which is deliberately kept relatively high. Preferably the NOx content in the input tail gas fed to the abatement stage is at least 300 ppm, more preferably at least 500 ppm, even more preferably at least 700 ppm, for example in a particularly preferred embodiment 800 to 1200 ppm. The above contents are in given in ppm (parts per million) in volume.

A relatively high NOx increases the difference of temperature (delta T) across the abatement system, hence a smaller heat exchange surface is required and a smaller and less expensive heat exchanger can be used.

A relatively high NOx in tail gas can be achieved for example by one or more of the following measures, or equivalent measures resulting in appropriately NOx content in tail gas: operating the absorption tower at relatively high temperature; operating the absorption tower at high feed gas flow rate; setting a bypass of nitrous gas from the burner around the absorption column; by feeding directly an appropriately small portion of nitrous gas from the burner into the tail gas from absorber; setting an appropriate ratio of flow rate of air and ammonia to the ammonia oxidation stage of the nitric acid process, e.g. setting a relatively low air excess to the nitric acid burner over the stoichiometric amount.

In principle, a greater amount of NOx escaping the absorber either because it is not captured therein or because the absorber is partly bypassed according to the invention is a loss of nitric acid production. However the applicant has found that loss of production is very small, even with relatively high NOx in tail gas, that the additional NOX can be abated with practical catalyst volumes, and is overcompensated by the benefit in terms of N2O abatement. For example a content of 1000 ppm NOx in the tail gas corresponds to a loss of nitric acid production of less than 0.5%.

A further object of the present invention is a method of revamping a system for reducing the content of NOx and N2O of a tail gas of a nitric acid production plant, according to the claims.

A method of revamping according to the invention can be applied to nitric production plant either comprising a pre-existing abatement stage for removing NOx and N2O from the tail gas, that is a tertiary and/or quaternary abatement stage, or to a plant where no such abatement is provided, that is typically the case of old plants.

In an embodiment, the method of revamping of the invention is performed on a nitric acid production plant wherein conditioning of the tail gas only includes abatement of NOx. In this embodiment, a method of revamping according to the invention includes the installation of a new deN2O stage.

Still another aspect of the invention is a method for revamping a nitric acid production plant wherein the tail gas has a temperature of less than 400° C. and the plant comprises neither a tertiary nor a quaternary abatement stage of NOx and/or N2O. In such a case, a method according to the invention includes preferably:

the installation of an abatement stage for the tail gas, including at least a deNOx stage and a deN2O stage;

the installation of a tail gas pre-heater upstream of said abatement stage, wherein the pre-heater receives the tail gas and supplies pre-heated tail gas to the abatement stage, and the installation of a flow line arranged to send at least a portion of conditioned gas leaving the abatement stage to said tail gas pre-heater, wherein said conditioned gas acts as hot heat exchange medium of the preheater.

According to the above embodiments, the invention provides an attractive way to modernize outdated nitric acid plants and meet the more recent environmental requirements.

The invention is now illustrated with the aid of FIG. 1 relating to a preferred embodiment.

DETAILED DESCRIPTION

FIG. 1 shows a block scheme of a process according to the invention.

Block 1 represents a tail gas pre-heater and block 2 represents an abatement system performing a stage of catalytic N2O decomposition (deN2O) and a stage of catalytic NOx reduction (deNOx).

A tail gas 10 mainly containing NOx and N2O is supplied to the pre-heater 1. For example, said tail gas 10 is the effluent of the absorption tower of a nitric acid plant (not shown).

Said tail gas 10 has a temperature lower than 400° C. and is heated to a temperature higher than 400° C. by heat exchange with a hot medium 12 inside said pre-heater 1. Said pre-heater 1 is for example a shell-and-plate heat exchanger, wherein the input tail gas flows shell-side and the hot medium flows plate-side. The pre-heater 1 is an indirect heat exchanger where the hot medium and the cold medium do not mix.

The pre-heated tail gas leaves the pre-heater as stream 11.

The stream 11 is supplied to the abatement system 2, wherein it is submitted to a deNOx stage and to a deN2O stage either in a single catalytic bed or in subsequent catalytic beds (not shown), providing a conditioned gas 12 with a lower content of NOx and N2O.

Due to the exothermicity of the deNOx and deN2O stages, said conditioned gas 12 has a temperature greater than the input stream 11 and is used as hot medium in the pre-heater 1.

After heat exchange, the hot medium leaves the pre-heater 1 as stream 13 at a lower temperature and is sent to an expander (not shown) for energy recovery.

EXAMPLE

A tail gas 10 contains 1000 ppm of N2O and 1000 ppm of NOx (NO2/NOx molar ratio of about 0.5). Said tail gas enters the pre-heater 1 at a temperature of 360° C. and leaves the pre-heater 1 at a temperature of 425° C. as stream 11.

The preheated tail gas 11 enters the abatement system 2, wherein an abatement of 90% of NOx and 90% of N2O is achieved, thus providing a conditioned gas 12 containing 100 ppm of N2O and 100 ppm of NOx.

Said conditioned gas 12 leaves the abatement system 2 at a temperature of 435° C. and is fed as hot heat exchange medium to the pre-heater 1.

The conditioned gas leaves the pre-heater as stream 12 at a temperature of 370° C.

The invention claimed is:

1. A process for reducing the content of NOx and N2O from an input tail gas produced in a nitric acid process, said input tail gas having a temperature lower than 400° C., the process comprising:

an abatement stage including at least a stage of catalytic N2O decomposition (deN2O) over an iron-loaded zeolite catalyst and a stage of catalytic NOx reduction (deNOx), said abatement stage providing a conditioned tail gas having a temperature greater than the input tail gas, wherein:

prior to submission to said abatement stage, said input tail gas is pre-heated to a temperature of at least 400° C. by indirect heat exchange with at least a portion of said conditioned tail gas;

said deN2O and deNOx stages being carried out:
in separated catalytic beds and said deNOx stage being carried out over at least one of: a vanadium catalyst, a copper-loaded zeolite catalyst, or an iron-loaded zeolite catalyst, or
concurrently in the same catalytic bed over at least an iron-loaded zeolite catalyst.

2. The process according to claim 1, wherein said input tail gas has a temperature from 300° C. to 370° C.

3. The process according to claim 1, wherein said input tail gas has a temperature from 330° C. to 370° C.

4. The process according to claim 1, wherein said input tail gas is pre-heated to a temperature greater than 410° C.

5. The process according to claim 1, wherein said input tail gas is pre-heated to a temperature greater than 420° C.

6. The process according to claim 1, wherein:
said nitric acid process includes oxidation of a stream of ammonia, obtaining a gaseous stream containing NOx and N2O, and absorption of NOx into an absorption medium, obtaining nitric acid and a tail gas containing nitrogen, N2O and residual NOx; and
said input tail gas is provided by at least part of the tail gas obtained from said absorption.

7. The process according to claim 1, wherein:
said nitric acid process includes oxidation of a stream of ammonia, obtaining a gaseous stream containing NOx and N2O; absorption of NOx into an absorption medium, obtaining nitric acid and a tail gas containing nitrogen, N2O and residual NOx; work-expansion of at least a portion of said tail gas, producing power; and
said input tail gas is provided by the tail gas obtained after said work-expansion.

8. The process according to claim 1, wherein said deNOx stage is carried out downstream or upstream of said deN2O stage.

9. The process according to claim 1, wherein one of said deNOx stage or deN2O stage is a first stage and the other of said deNOx stage or deN2O stage is a second stage downstream said first stage, and a portion of said input tail gas bypasses said first stage and is sent directly to said second stage.

10. The process according to claim 1, wherein all the heat transferred to said input tail gas during the pre-heating of said input tail gas is taken from said conditioned gas and no heat is transferred to said input tail gas from an external heat source such as a fired preheater.

11. The process according to claim 1, wherein the NOx content of the input tail gas is at least 300 ppm (volume) volume.

12. The process according to claim 1, wherein the NOx content of the input tail gas is at least 500 ppm.

13. The process of claim 1, wherein the input tail gas in the deN2O and deNOx stages has a space velocity from 5,000 to 50,000 1/h, based on the catalyst volume in m3 and the flow rate in Nm3/h.

* * * * *